United States Patent Office 3,492,753
Patented Feb. 3, 1970

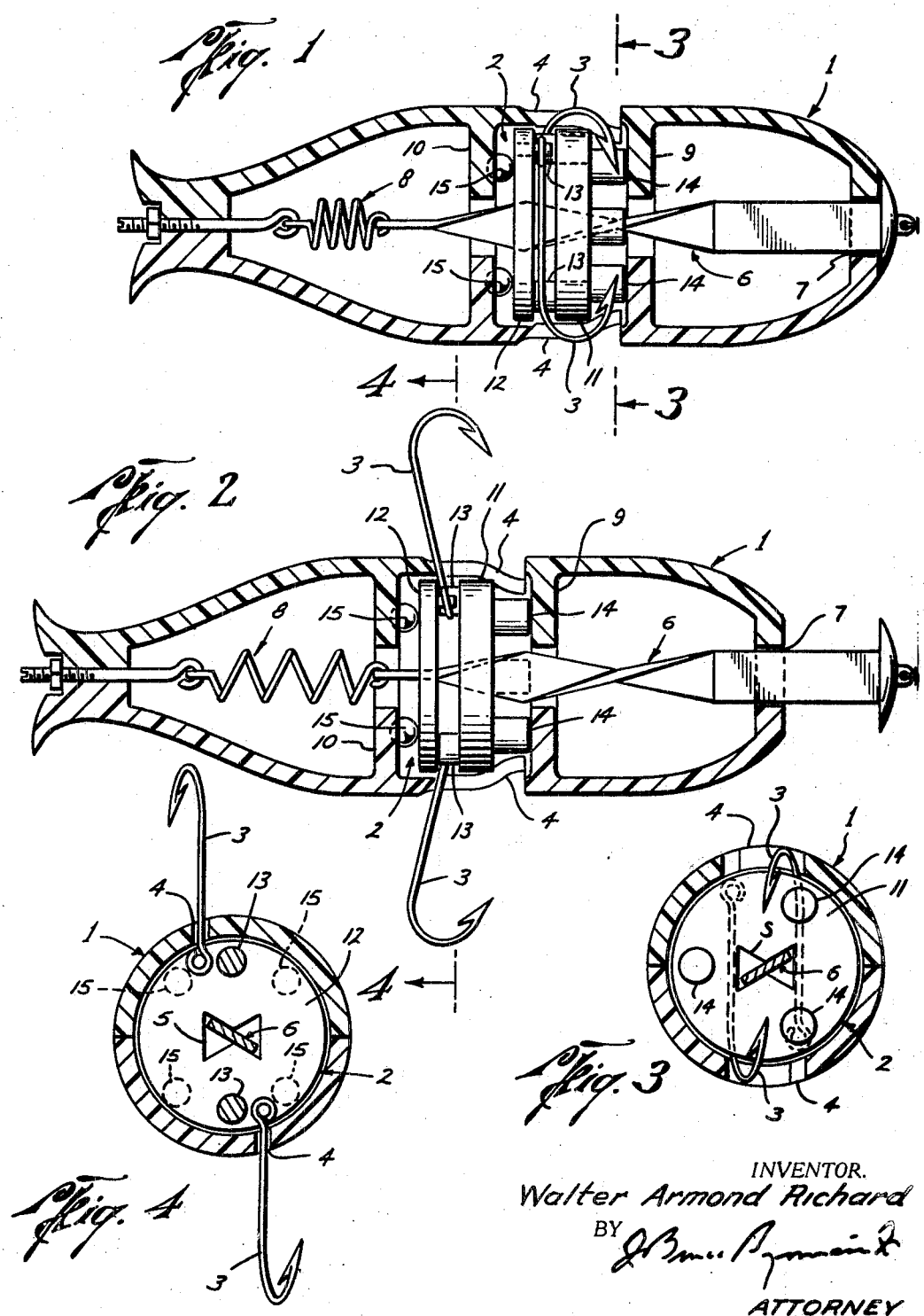

3,492,753
FISHING LURE
Walter Armond Richard, 1501 Sabine Ave.,
Port Arthur, Tex. 77640
Filed Aug. 2, 1968, Ser. No. 749,875
Int. Cl. A01k 85/00
U.S. Cl. 43—35                                    2 Claims

ABSTRACT OF THE DISCLOSURE

A hollow fishing plug or lure having a smooth-surfaced body which simulates a minnow or the like includes a rotor mounted therein to rotate about the longitudinal axis of the body. A pair of hooks is mounted on the rotor on diametrically-opposite sides thereof with each hook extended through an aperture in the body wall as the rotor is caused to rotate by a twisted strip or screw moved longitudinally through the forward end of the body and a specially-formed hole in the rotor. The hooks are normally wholly concealed within the body so that they do not become entangled with weeds and other objects upon casting, and when the lure is struck by a fish, the strip or screw is moved to turn the rotor and eject the hooks, whereby they extend laterally outwardly beyond the body for engagement by the fish.

---

This invention relates to a fishing lure, and it concerns more particularly certain specific improvements in a fishing plug or lure having a smooth-surfaced body in which the hooks are wholly concealed so that they do not become entangled with weeds and other objects upon casting, and in which, when the plug is struck by a fish, the hooks are ejected whereby they extend laterally outwardly beyond the body for engagement by the fish.

The invention includes an elongated hollow body or casing which advantageously may simulate a minnow, a small fish, or the like. A rotor received within the body is arranged to rotate about an axis coinciding with the longitudinal axis of the body, and a pair of hooks are connected to marginal portions of the motor, on diametrically opposite sides thereof. The shank of each hook is passed through a corresponding hole in one side of the body and extends laterally outwardly therefrom, whereby the barbed end of the hook is ejected, and thereafter retracted, as the rotor completes a half turn in one direction and then returns to its original position.

The rotor has a hole in its center, as hereinafter described, through which an elongated twisted strip or screw is passed. The twisted strip or screw extends through a hole in the front end of the body and has its rearward end connected to the body adjacent its rearward end by a tension spring.

The front end of the twisted strip or screw extends forwardly beyond the body, and in use is connected to a fishing line preparatory to casting the plug.

The hole in the rotor loosely encircles the twisted strip or screw and is conformable to the leading edges of the twisted strip or screw relative to its direction of rotation in either direction about its axis relative to the rotor, so that the rotor is caused to spin in one direction or the other as the twisted strip or screw is moved longitudinally in either direction relative to the rotor.

The invention further includes means for abutting engagement with the rotor to limit longitudinal movement of the rotor, with the twisted strip or screw, in either direction relative to the body, whereby the rotor is positively moved longitudinally, in one direction or the other, relative to the twisted strip or screw, as the twisted strip or screw is moved longitudinally in either direction relative to the body.

The arrangement is such that when the twisted strip or screw is pulled forwardly relative to the body, as when the body is struck by a fish, or in hard casting, the rotor is caused to complete a half turn in one direction by the action of the twisted strip or screw thereon, and upon releasing the tension applied to the twisted strip or screw, whereby it is retracted by the action of the spring thereon, the rotor is returned to its original position.

The invention will be readily understood by referring to the following description and the accompanying drawing, in which:

FIG. 1 is a longitudinal view, taken on a median line, of a fishing lure embodying the invention, showing the hooks in their retracted positions;

FIG. 2 is a longitudinal sectional view, similar to FIG. 1, showing the hooks in their extended positions;

FIG. 3 is a transverse sectional view taken on the line 3—3 of FIG. 1; and

FIG. 4 is a transverse sectional view taken on the line 4—4 of FIG. 2.

Referring to the drawing, the fishing plug or lure of the invention includes an elongated hollow body or casing, designated generally by the numeral 1, which advantageously may simulate a minnow, a small fish, or the like.

A rotor, indicated generally by the numeral 2, which is received within the body 1, is arranged to rotate about an axis coinciding with the longitudinal axis of the body 1, and a pair of hooks 3 are connected to marginal portions of the rotor 2, on diametrically opposite sides thereof.

The shank of each of the hooks 3 is passed through one of two holes 4 in opposite sides of the body 1 and extends laterally outwardly therefrom, whereby the barbed end of the hook 3 is ejected, and thereafter retracted, as the rotor 2 completes a half turn in one direction and then returns to its original position.

The rotor 2 has a hole 5 in its center, as hereinafter described, through which an elongated twisted strip or screw 6 is passed. The twisted strip or screw 6 extends through a hole 7 in the front end of the body 1 and has its rearward end connected to the body 1 adjacent its rearward end by a tension spring 8.

The front end of the twisted strip or screw 6 extends forwardly beyond the body 1, and in use is connected to a fishing line preparatory to casting the plug.

The hole 5 in the rotor 2 loosely encircles the twisted strip or screw 6 and is conformable to the leading edges of the twisted strip or screw 6 relative to its direction of rotation in either direction about its axis relative to the rotor 2, so that the rotor 2 is caused to spin in one direction or the other as the twisted strip or screw 6 is moved longitudinally in either direction relative to the rotor 2.

The invention further includes means as hereinafter described for abutting engagement with the rotor 2 to limit longitudinal movement of the rotor 2, with the twisted strip or screw 6, in either direction relative to the body 1, whereby the rotor 2 is positively moved longitudinally, in one direction or the other, relative to the twisted strip or screw 6, as the twisted strip or screw 6 is moved longitudinally in either direction relative to the body 1.

The arrangement is such that when the twisted strip or screw 6 is pulled forwardly relative to the body 1, as when the body 1 is struck by a fish, or in hard casting, the rotor 2 is caused to complete a half turn in one direction by the action of the twisted strip or screw 6 thereon, and upon releasing the tension applied to the twisted strip or screw 6, whereby it is retracted by the action of the spring 8 thereon, the rotor 2 is returned to its original position.

Both the body 1 and the rotor 2 advantageously may be made of molded plastic material.

The body 1 has a pair of transverse partitions or bulkheads, numbered 9 and 10, respectively, which are positioned forwardly and rearwardly of the rotor 2 and serve as thrust bearings which prevent longitudinal movement of the rotor 2 with the twisted strip or screw 6, as the twisted strip or screw 6 is advanced and retracted relative to the body 1, so that the rotor 2 must turn in response to the action of the twisted strip or screw 6 thereon.

As shown, the rotor 2 consists of two separate discs, numbered 11 and 12, respectively, which are positioned forwardly and rearwardly thereof, having spacer elements 13 between them whereby they are connected in predetermined spaced apart relation to each other.

The front disc 11 of the rotor 2 has other spacer elements 14 on the front side thereof for sliding, semi-frictional engagement with the opposing surface of the front partition 9 as the twisted strip or screw 6 is pulled forwardly relative to the body 1.

The rearward partition 10 has still other spacer elements 15, which as illustrated are rounded, on the front side thereof for sliding, substantially non-frictional engagement with the opposing surface of the rear disc 12 of the rotor 2, as the twisted strip or screw 6 is retracted relative to the body 1.

The intention is that the rotor 2, because of the sliding, semi-frictional engagement of the spacer elements 14 with the front partition 9, should be characterized by a degree of resistance to turning, so that the hooks 3 are prevented from being ejected prematurely or accidentally, as the twisted strip or screw 6 is pulled forwardly relative to the body 1, to thereby eject the hooks 3.

The hooks 3 are connected to the front side of the rear disc 12 of the rotor 2 and extend laterally outwardly through the holes 4 in opposite sides of the body 1. In their retracted positions the barbed ends of the hooks 3 are received in the holes 4 and extend inside the body 1, where they are hooked over the peripheral edge of the front disc 11 of the rotor 2.

The holes 4 have an enlarged portion forwardly thereof in which the barbed end of the corresponding hook 3 is received, as above described, in the retracted position thereof, and a comparatively-narrow longitudinally-extending portion, rearwardly of the enlarged portion, through which the shank of the hook 3 is passed, and which limits rotative movement of the hook 3 with the rotor 2 in response to longitudinal movement of the twisted strip or screw 6 in either direction.

In their ejected positions the hooks 3 are inclined rearwardly and laterally outwardly, in trailing position relative to the body 1.

The invention may be modified in various ways without departing from the spirit and scope thereof.

I claim:

1. In a fishing plug or lure having a smooth surfaced body in which the hooks are wholly concealed so that they do not become entangled with weeds and other objects upon casting, and in which, when the plug is struck by a fish, the hooks are ejected whereby they extend laterally outwardly beyond the body for engagement by the fish, the improvement which comprises, in combination, an elongated hollow body having a rotor arranged therein for rotation about an axis coinciding with the longitudinal axis of the body, the rotor having a pair of hooks connected to marginal portions on diametrically opposite sides thereof, the shank of each hook being passed through one of two holes in opposite sides of the body and extending laterally outwardly therefrom, whereby the barbed end of the hook is ejected, and thereafter retracted, as the rotor completes a half turn in one direction and then returns to its original position, and an elongated twisted strip or screw aligned axially with the body and extending through holes therefor in the rotor and in the front end of the body, and having its rearward end connected to the body adjacent its rearward end by a tension spring, the twisted strip or screw coacting with the rotor to spin it in one direction or the other in response to longitudinal movement of the twisted strip or screw in either direction relative to the body, and the front end of the twisted strip or screw extending forwardly beyond the body for use in connecting it to a fishing line preparatory to casting the plug.

2. The structure of claim 1, and means for abutting engagement with the rotor to limit longitudinal movement of the rotor, with the twisted strip or screw, in either direction relative to the body, whereby the rotor is positively moved longitudinally, in one direction or the other, relative to the twisted strip or screw, as the twisted strip or screw is moved longitudinally in either direction relative to the body.

References Cited

UNITED STATES PATENTS

| | | | |
|---|---|---|---|
| 446,827 | 2/1891 | Cass | 43—35 |
| 806,898 | 12/1905 | Kepler | 43—35 |
| 1,609,151 | 11/1926 | Bruenig | 43—35 |

SAMUEL KOREN, Primary Examiner

D. J. LEACH, Assistant Examiner

U.S. Cl. X.R.

43—37